US007870575B2

(12) United States Patent
Spio (10) Patent No.: US 7,870,575 B2
(45) Date of Patent: Jan. 11, 2011

(54) METHODOLOGY FOR DISPLAY/DISTRIBUTION OF MULTIPLE CONTENT VERSIONS BASED ON DEMOGRAPHICS

(75) Inventor: Mary A. Spio, Long Beach, CA (US)

(73) Assignee: The Boeing Company, Chicago, IL (US)

(*) Notice: Subject to any disclaimer, the term of this patent is extended or adjusted under 35 U.S.C. 154(b) by 2710 days.

(21) Appl. No.: 10/412,361

(22) Filed: Apr. 11, 2003

(65) Prior Publication Data
US 2004/0019901 A1 Jan. 29, 2004

Related U.S. Application Data

(60) Provisional application No. 60/376,213, filed on Apr. 29, 2002.

(51) Int. Cl.
H04N 7/16 (2006.01)
(52) U.S. Cl. .................... 725/28; 725/31; 725/63
(58) Field of Classification Search .............. 725/28, 725/31, 63
See application file for complete search history.

(56) References Cited

U.S. PATENT DOCUMENTS 5,420,866 A * 5/1995 Wasilewski ............... 370/426
5,610,653 A * 3/1997 Abecassis ................. 348/170

OTHER PUBLICATIONS

Kirovski et al., "Digital Rights Management for Digital Cinema," Inter. Symp. on Optical Science & Tech.—Security in Imaging: Theory & Applications, San Diego, CA, Jul. 2001, 16 pages.
National Association of Theatre Owners; "Digital Cinema User Requirements," Feb. 22, 2002, pp. 1-3.
Hose et al., "Data Transport and Processing in a Digital Cinema Theatre System," Qualcomm Incorporated from the 36th Advanced Motion Imaging Conference, Feb. 7-9, 2002, 21 pages.

* cited by examiner

Primary Examiner—Lester Kincaid
Assistant Examiner—Mehmood B Khan
(74) Attorney, Agent, or Firm—Gates & Cooper LLP (57) ABSTRACT

A method and apparatus for distributing different versions of media programs is disclosed. The method comprises the steps of segmenting media program data collectively describing different versions of the media program into a plurality of media segments wherein each media segment is includes at least one component associated with one or more attributes having one or more attributes values; generating a mapping of each attribute value with a pointer to the component of the segment of the media program data having the attribute associated with the attribute value; generating a manifest from the mapping and from data describing an authorized media program version authorized for display at the display entity; and transmitting the media program data and the manifest to the display entity.

27 Claims, 7 Drawing Sheets

| TITLE (VERSION) | | |
|---|---|---|
| SEGMENT | COMPONENT | POINTER |
| 1 | VIDEO | P1 |
| 1 | AUDIO | P3 |
| 1 | TEXT | P7 |
| 2 | VIDEO | P- |
| ... | ... | ... |
| N | TEXT | PM |

METHODOLOGY FOR DISPLAY/DISTRIBUTION OF MULTIPLE CONTENT VERSIONS BASED ON DEMOGRAPHICS

CROSS-REFERENCE TO RELATED APPLICATIONS

This application claims benefit of U.S. Provisional Patent Application No. 60/376,213, entitled "METHODOLOGY FOR DISPLAY/DISTRIBUTION OF MULTIPLE CONTENT VERSIONS BASED ON DEMOGRAPHICS," by Mary A. Spio, filed Apr. 29, 2002, which application is hereby incorporated by reference herein.

This application is related to the following commonly assigned patent application(s), all of which applications are incorporated by reference herein:

U.S. Provisional Application Serial No. 60/376,105, entitled "SECURE DATA CONTENT DELIVERY SYSTEM FOR MULTIMEDIA APPLICATIONS UTILIZING BANDWIDTH EFFICIENT MODULATION", by Charles F. Stirling, Bernard M. Gudaitis, William G. Connelly, and Catherine C. Girardey, filed Apr. 29, 2002;

U.S. Provisional Application Serial No. 60/376,244, entitled "METHOD TO SECURELY DISTRIBUTE LARGE DIGITAL VIDEO/DATA FILES WITH OPTIMUM SECURITY," by Ismael Rodriguez and James C. Campanella, filed Apr. 29, 2002;

U.S. Utility patent application Ser. No. 10/213,396, filed Aug. 6, 2002, by Inventor Joseph S. Ng, entitled BANDWIDTH-EFFICIENT AND SECURE METHOD TO COMBINE MULTIPLE LIVE EVENTS TO MULTIPLE EXHIBITORS, now abandoned, which itself claims the benefit of U.S. Provisional Patent Application Serial No. 60/376,333, filed Apr. 29, 2002, by inventor Joseph S. Ng, entitled BANDWIDTH EFFICIENT AND SECURE METHOD TO COMBINE MULTIPLE LIVE EVENTS TO MULTIPLE EXHIBITORS;

U.S. Utility patent application Ser. No. 10/178,602, filed Jun. 24, 2002, by Inventor Michael A. Enright, METHOD AND APPARATUS FOR DECOMPRESSING AND MULTIPLEXING MULTIPLE VIDEO STREAMS IN REAL-TIME, now abandoned, which claims the benefit of U.S. Provisional Patent Application Serial No. 60/376,254, filed Apr. 29, 2002, by inventor Michael A. Enright, entitled METHOD TO DECOMPRESS AND MULTIPLEX MULTIPLE VIDEO STREAMS IN REAL-TIME;

U.S. Provisional Patent Application Serial No. 60/376,087, filed Apr. 29, 2002, by inventor Mary A. Spio, entitled METHODOLOGY FOR DISPLAY AND DISTRIBUTION OF LIVE CINEMA GRADE CONTENT IN REAL TIME,;

U.S. Utility patent application Ser. No. 10/360,019, filed Feb. 7, 2003, by inventors Joseph S. Ng and Robyn M. Akers, entitled COMBINING MULTIPLE SIMULTANEOUS SOURCE CINEMA TO MULTIPLE EXHIBITOR RECEIVERS, which claims the benefit of U.S. Provisional Patent Application Serial No. 60/376,240, filed Apr. 29, 2002, by inventors Joseph S. Ng and Robyn M. Akers, entitled COMBINING MULTIPLE SIMULTANEOUS SOURCE CINEMA TO MULTIPLE EXHIBITOR RECEIVERS;

U.S. Provisional Patent Application Serial No. 60/376,216, filed Apr. 29, 2002, by inventors Ismael Rodriguez and Robyn M. Akers, entitled SECURE METHOD TO INTEGRATE USE MANAGEMENT AND CONDITIONAL ACCESS INTO A SINGLE DATABASE; and U.S. Provisional Patent Application Serial No. 60/376,243, filed Apr. 29, 2002, by inventors Bernard Mark Gudaitis and William G. Connelly, entitled ARCHITECTURE CONTAINING EMBEDDED COMPRESSION AND ENCRYPTION ALGORITHMS WITHIN THE DATA FILE.

BACKGROUND OF THE INVENTION

1. Field of the Invention

The present invention relates to systems and methods for delivering media to multiple exhibitors. Particularly, the present invention relates to such systems and methods for use in digital cinema applications.

2. Description of the Related Art

The methods by which movies and other media programs that are distributed to theaters for display to audiences have not substantially changed in over 75 years. Celluloid copies of such movies are distributed to each theater in advance of the first showing, and the same copy is repeatedly displayed for audiences until the movie is excessively worn, the license expires, or the theater stops showing the movie in favor of a more popular movie.

There are several problems with this process. First, the process of manually and securely distributing physical celluloid copies of each movie is costly. Second, it is time consuming. This is especially important in circumstances where last minute changes must be made to the film before release. Such time concerns often prohibit that any such changes be made.

There is therefore a need for a method and system for distributing media programs in a rapid and inexpensive manner. As will be described further herein, the present invention solves that need by providing for the distribution of digital copies of media programs via a satellite or other high bandwidth medium. For example, digital cinema systems provide the ability for distributing digital copies of motion picture "films" electronically directly to theatres running exhibitor systems.

However, the use of digital cinema systems presents additional challenges. For example, every movie produced or distributed in the United States must be rated by the Motion Picture Association of America (MPAA) for content according to moral viability. A movie is deemed acceptable for a particular demographic group depending on the MPAA rating that the movie is assigned. Current MPAA ratings include General Audiences (G-All Ages Admitted), Parental Guidance Suggested (PG-Some Materials May Not Be Suitable for Children), Parents Strongly Cautioned (PG-13: Some Material Maybe Inappropriate for Children under 13), Restricted (R-Under 17 Requires Accompanying Parent or Adult Guardian), and NC-17 (No One Under 17 Admitted).

The MPAA rating affects the advertising and the kinds of audiences that the movie attracts, which in turn can result in significant fiscal and cultural losses for the content generator. These losses can be ameliorate it somewhat by creating different versions of the film, each directed at different viewer demographics. For example, a movie may be marketed in R, PG, and G versions, allowing the producers/exhibitors of the movie to reach as many viewers as possible, and maximize return.

Further, before being shown on broadcast television, many movies must be edited to remove/alter content so that the film complies with the social norms required for a network broadcast. In some circumstances, even among films broadcast on television, different versions may be appropriate depending upon when the broadcast actually takes place. For example, a movie broadcast at 7 p.m. may have significantly altered content, while a movie broadcast at 1 a.m. may not.

Today, content is broken into reels; image, audio and text (subtitle) reels are usually separate with splice points for corresponding reels during authoring or production. When the film is delivered to the exhibitor, it is delivered with an attached "manifest", which lists how the reels are to be combined to produce the "title." The manifest therefore acts as a guide for recombining the reels at the exhibitor's site. Each title uses a separate and different manifest than any other title. Different versions of the same content (i.e. a PG-Rated Version, a Japanese language version) of the same content are different "titles" with unique manifests, thus they are independently stored, marketed and distributed.

For example, a Chinese PG-Rated version of movie is treated as a separate movie/title and will require separate packaging and delivery as the original English PG-20 Rated version. If an "R" -rated English version of the same movie is distributed elsewhere, it will also be treated as yet a third title and require its own packaging, and distribution. If N MPAA Rated versions of a movie were to be distributed in N languages, it would require N*N independently packaged and distributed titles or movies.

This is real estate intensive and logistically difficult to implement. So much so, in fact, that few distributors/exhibitors engage in the practice of handling different movie versions. This results in exclusion of content from many markets, and incremental losses over thousands of such exclusions worldwide can result in significant loss of revenue.

What is needed is a method and apparatus for providing different versions of media programs to distributors/exhibitors in a timely and cost efficient manner. The present invention satisfies this need.

SUMMARY OF THE INVENTION

To address the requirements described above, the present invention discloses a method and apparatus for distributing different versions of media programs. The method comprises the steps of segmenting media program data collectively describing different versions of the media program into a plurality of media segments wherein each media segment is includes at least one component associated with one or more attributes having one or more attributes values; generating a mapping of each attribute value with a pointer to the component of the segment of the media program data having the attribute associated with the attribute value; generating a manifest from the mapping and from data describing an authorized media program version authorized for display at the display entity, and transmitting the media program data and the manifest to the display entity.

The foregoing reduces the storage and distribution asset requirements by a factor of two or more, depending on the specific permutation that is employed. The foregoing also packages the content in a manner that allows choice diversifies the potential reach and use of the content, allowing the content producer, content distributor and content consumer to choose product on a more reasonable basis.

By representing various MPAA rated versions in a single file and reconstructing each version depending on the end user demographics, the present invention enables content generators to show multiple versions of their original content without the associated cost of reproduction, duplication and editing.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1A:
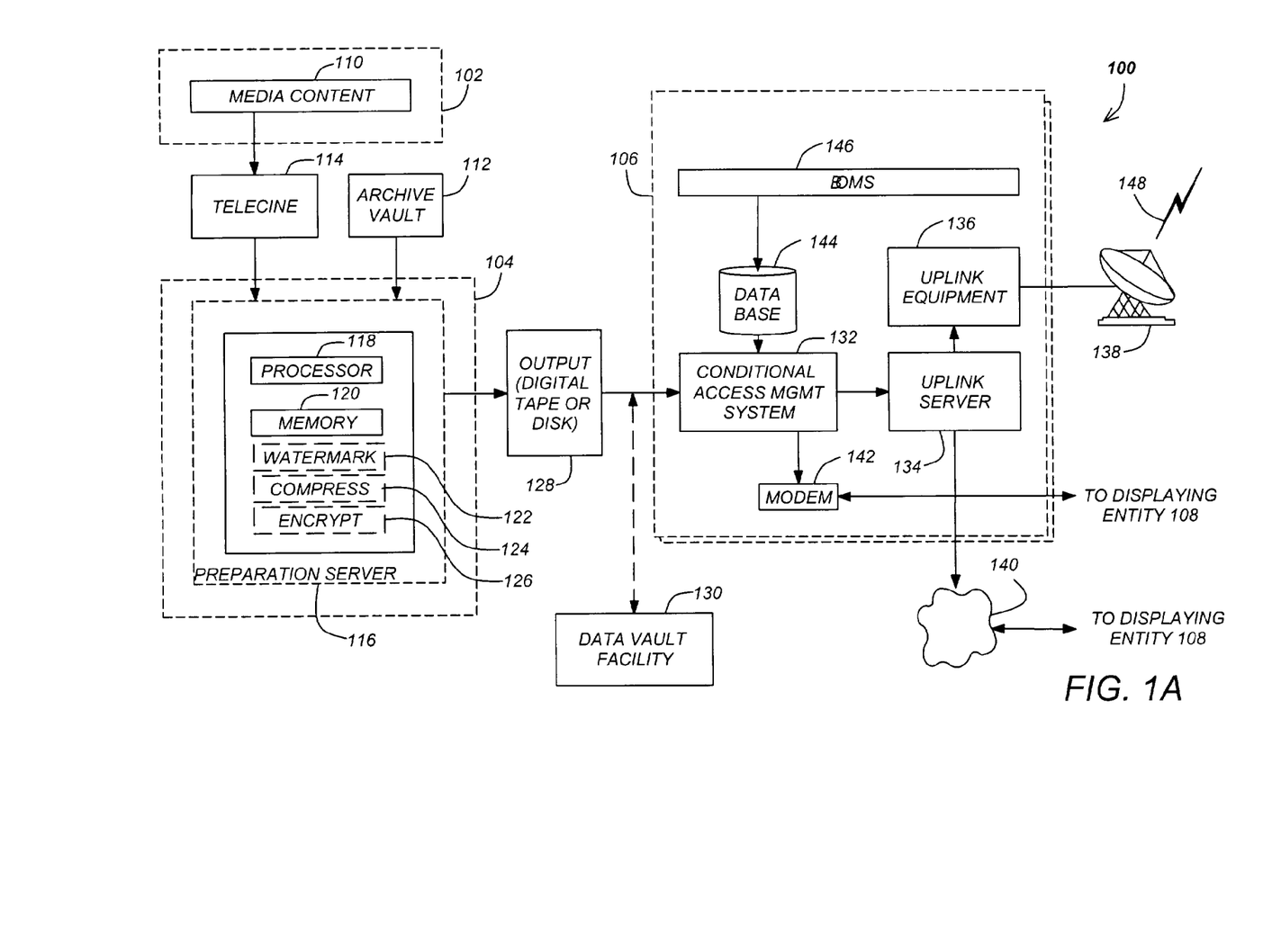
FIGS. 1A & 1B depict a top-level functional block diagram of one embodiment of a typical media program distribution system.
Figure 1B:
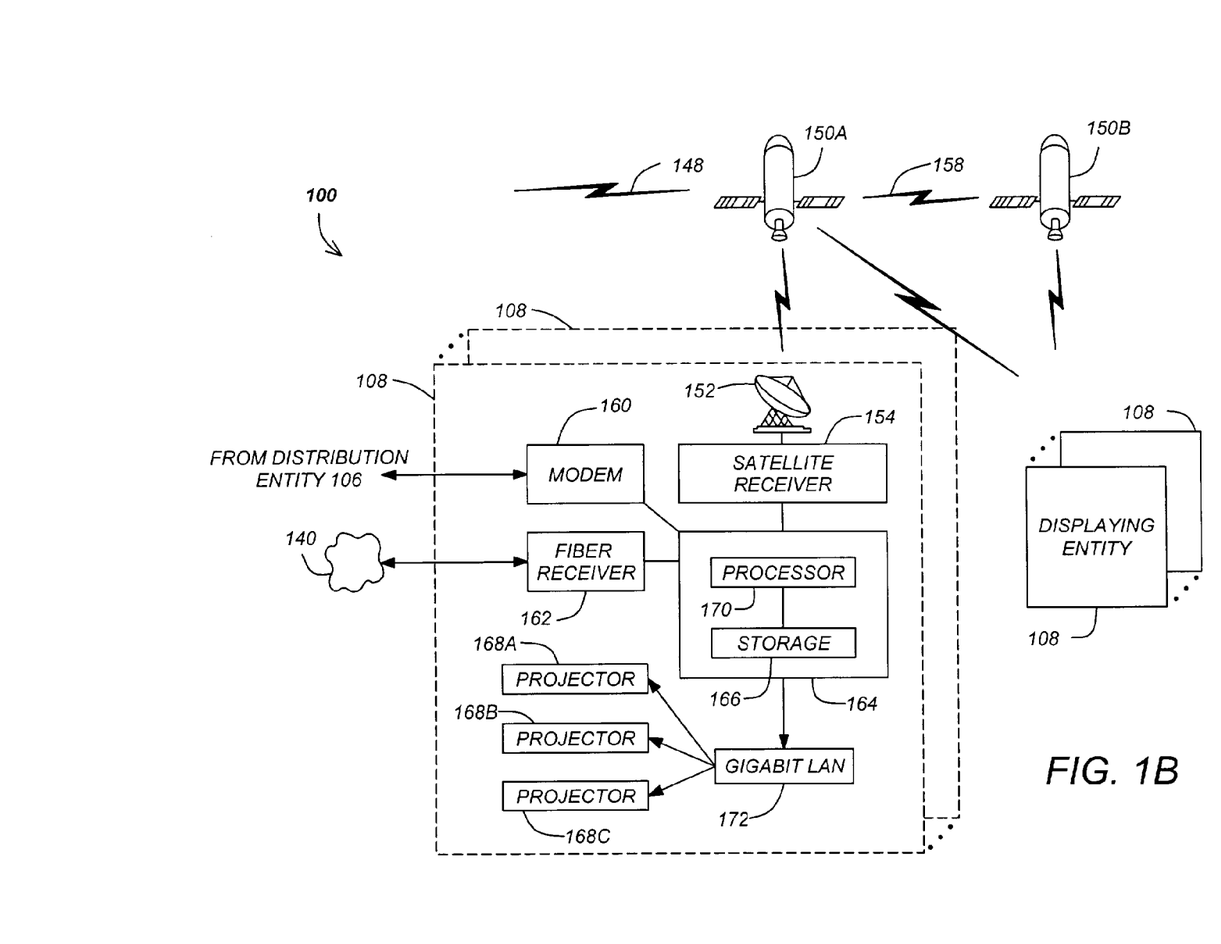

FIGS. 1A and 1B depict a top-level functional block diagram of one embodiment of a media program distribution system 100. The media distribution system 100 comprises a content provider 102, a protection entity 104, a distribution entity 106 and one or more presentation/displaying entities 108. The content provider 102 provides media content 110 such as audiovisual material to the protection entity 104. The media content 110, which can be in digital or analog form, can be transmitted in electronic form via the Internet, by dedicated land line, broadcast, or by physical delivery of a physical embodiment of the media (e.g. a celluloid film strip, optical or magnetic disk/tape). Content can also be provided to the protection entity 104 (also referred to as a preparation entity) from a secure archive facility 112.

The media content 110 maybe telecined by processor 114 to format the media program as desired. The telecine process can take place at the content provider 102, the protection entity 104, or a third party.

The protection entity 104 may include a media preparation processor 116. In one embodiment, the media preparation processor 116 includes a computer system such as a server, having a processor 118 and a memory 120 communicatively coupled thereto. The protection entity 104 further prepares the media content 110. Such preparation may include adding protection to the media content 110 to prevent piracy of the media content 110. For example, the preparation processor 116 can add watermarking 122 and/or encrypt 126 the media content 110 to protect it. In addition, the preparation processor can also apply compression 124 to the media content 110. Once prepared, the output media content 128 can be transferred to digital tape or a disk (e.g. a DVD, laserdisk, or similar medium). The output media content 128 can then be archived in a data vault facility 130 until it is needed.

When needed, the prepared output media content 128 is then provided to the distribution entity 106 (alternatively referred to hereinafter as the network operations center, or NOC). Although illustrated as separate entities, the protection entity 104 and the distribution entity 106 can be combined into a single entity, thus ameliorating some security concerns regarding the transmission of the output media content 128.

The distribution entity 106 includes a conditional access management system (CAMS) 132 (also referred to as a configuration management engine), that accepts the output media content 128, and determines whether access permissions are appropriate for the content 128. Further, CAMS 132 may be responsible for additional encrypting so that unauthorized access during transmission is prevented. Once the data is in the appropriate format and access permissions have been validated, CAMS 132 provides the output media content 128 to an uplink server 134, ultimately for transmission by uplink equipment 136 to one or more displaying entities 108 (also referred to as exhibitor systems) (shown in FIG. 1B). This is accomplished by the uplink equipment 136 and uplink antenna 138. Also, as shown, in addition or in the alternative to transmission via satellite, the media program can be provided to the displaying entity 108 via a forward channel fiber network 140. Additionally, information may be transmitted to displaying entity 108 via a modem 142 using, for example a public switched telephone network line. A land based communication such as through fiber network 140 or modem 142 is referred to as a back channel. Thus, information can be transmitted to and from the displaying entity 108 via the back channel or the satellite network Typically, the back channel provides data communication for administration functions (e.g. billing, authorization, usage tracking, etc.), while the satellite network provides for transfer of the output media content 128 to the displaying entities 108.

The output media content 128 may be securely stored in a database 144. Data is transferred to and from the database 144 under the control and management of the business operations management system (BOMS) 146. Thus, the BOMS 146 manages the transmission of information to 108, and assures that unauthorized transmissions do not take place.

Turning to FIG. 1B, the data transmitted via uplink 148 is received in a satellite 150A, and transmitted to a downlink antenna 152, which is communicatively coupled to a satellite or downlink receiver 154.

In one embodiment, the satellite 150A also transmits the data to a second distribution entity 108B and/or to another satellite 150B via crosslink 158. Typically, satellite 150B services a different terrestrial region than satellite 150A, and transmits data to displaying entities 108 in other geographical locations.

Figure 2:
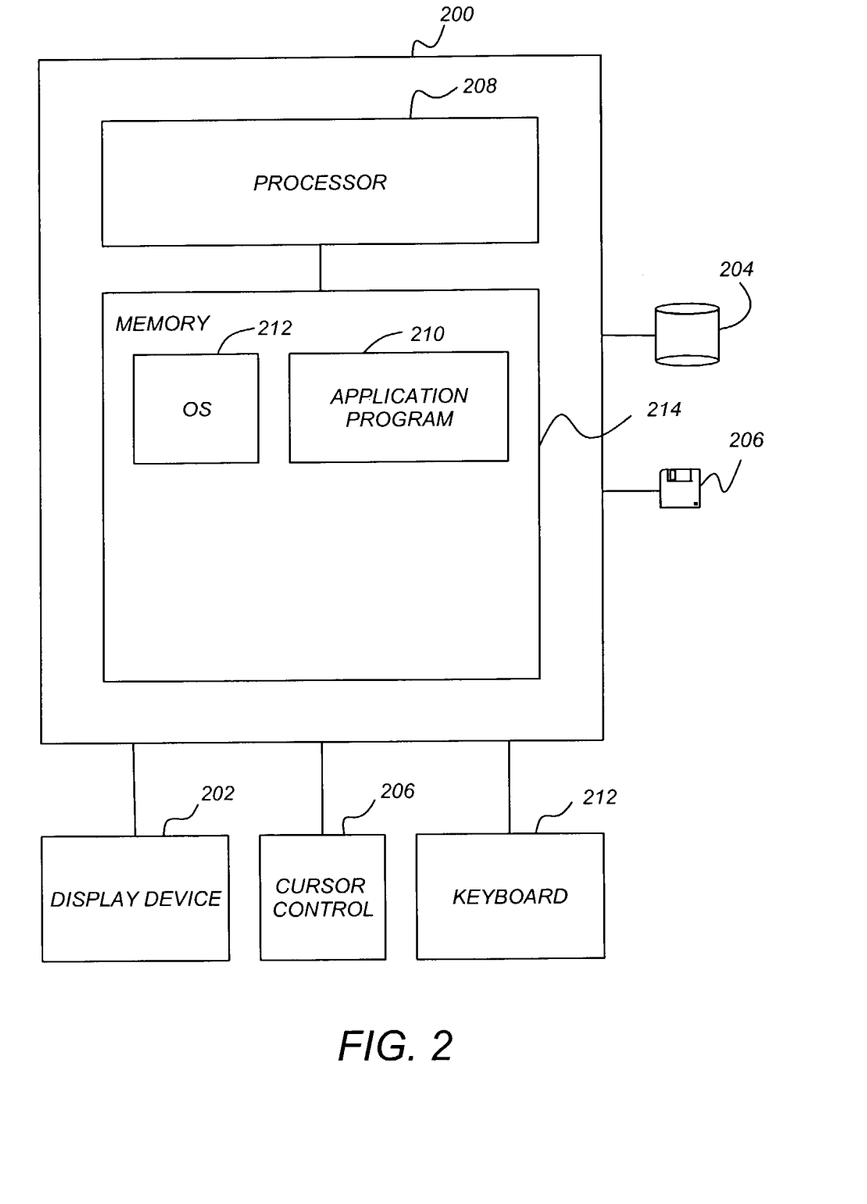
FIG. 2 is a functional block diagram of a computer system that can be used to perform the operations of the media preparation processor.

A typical displaying entity 108 comprises a modem 160 (and may also include a fiber receiver 158) for receiving and transmitting information through the back channel (i.e., via an communication path other than that provided by the satellite system described above) to and from the distribution entity 106. For example, feedback information (e.g. relating to system diagnostics, billing, usage and other administrative functions) from the exhibitor 108 can be transmitted through the back channel to the distribution entity 106. The output media content 128 and other information may be accepted into a processing system 164 (also referred to as a content server) such as a server or computer similar to that which is illustrated in FIG. 2 (see description below). The output media content 128 may then be stored in the storage device 166 for later transmission to displaying systems (e.g., digital projectors) 168A-168C. Before storage, the output media content 128 can be decrypted to remove transmission encryption (e.g. any encryption applied by the CAMS 132), leaving the encryption applied by the preparation processor 116.

When the media content 110 is to be displayed, final decryption techniques are used on the output media content 128 to substantially reproduce the original media content 110 in a viewable form which is provided to one or more of the displaying systems 168A-168C. For example, encryption 126 and compression 124 applied by the preparation processor 118 is finally removed, however, any latent modification, undetectable to viewers (e.g., watermarking 122) is left intact. In one or more embodiments, a display processor 170 prevents storage of the decrypted media content in any media, whether in the storage device 166 or otherwise. In addition, the media content 110 can be communicated to the displaying systems 168A-168C over an independently encrypted connection, such as on a gigabit LAN 172.

FIG. 2 is a functional block diagram of a computer system 200 that can be used to perform the operations of the media preparation processor 116 and processing system 164. Embodiments of the invention are typically implemented using a computer 200, which generally includes, inter alia, a display device 202, data storage devices 204, cursor control devices 206, and other devices. Those skilled in the art will recognize that any combination of the above components, or any number of different components, peripherals, and other devices, may be used with the computer 100.

Generally, the computer 200 operates under control of an operating system to 12 stored in the memory to 14, and interfaces with the user to accept inputs and commands and to present results on the display 202 and provide data to other systems coupled to the computer system 200. An application program 210, stored in memory 214 accesses and manipulates data stored in the memory 214 of the computer 200. The computer 200 also optionally comprises an external communication device such as a modem, satellite link, Ethernet card, or other device for communicating with other computers.

In one embodiment, instructions implementing the operating system 212, the application program 210 are tangibly embodied in a computer-readable medium, e.g., data storage device 204, 206, which could include one or more fixed or removable data storage devices, such as a zip drive, floppy disc drive, hard drive, CD-ROM drive, tape drive, etc. Further, the operating system 212 and the computer program 210 are comprised of instructions which, when read and executed by the computer 102, causes the computer 200 to perform the steps necessary to implement and/or use the present invention. Computer program 210 and/or operating instructions may also be tangibly embodied in memory 214 and/or data communications devices, thereby making a computer program product or article of manufacture according to the invention. As such, the terms "article of manufacture," "program storage device" and "computer program product" as used herein are intended to encompass a computer program accessible from any computer readable device or media.

Figure 3A:
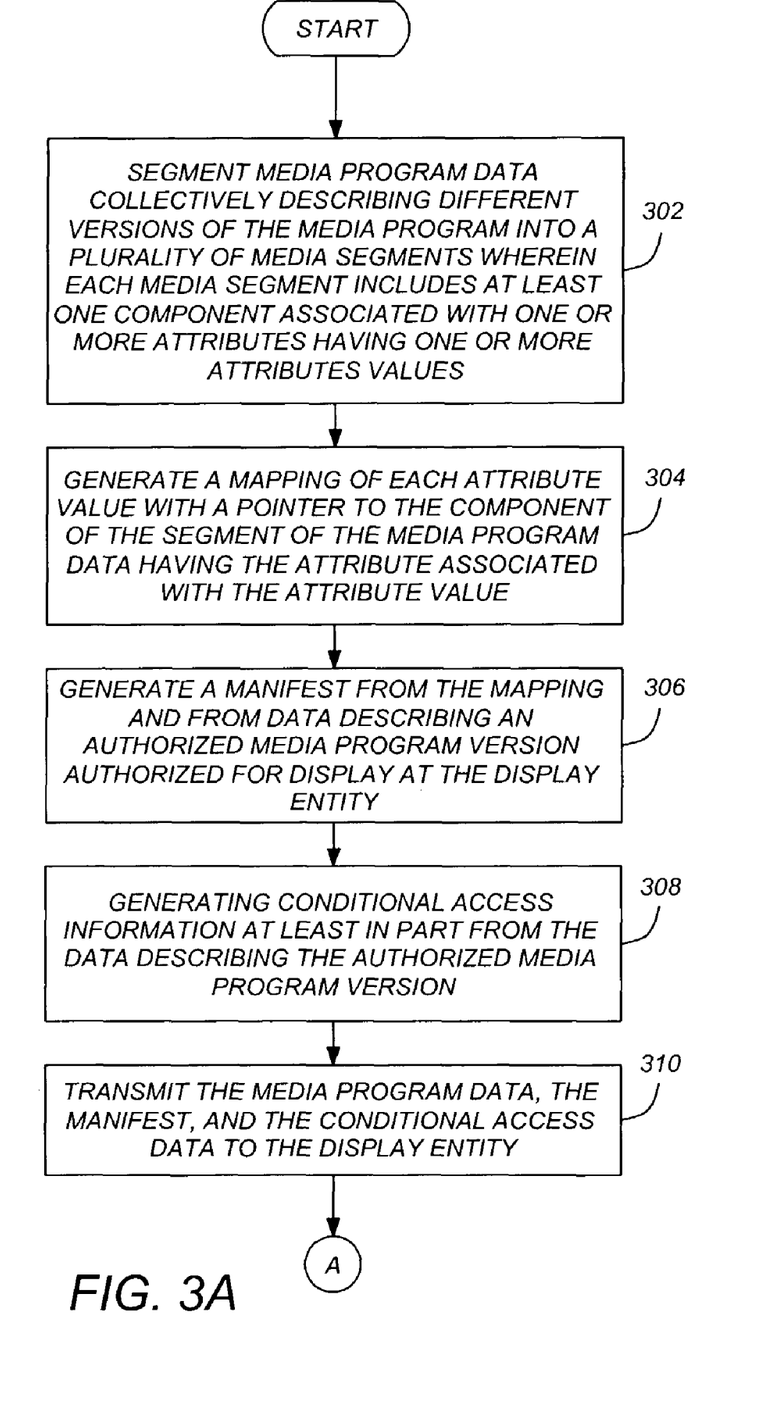
FIGS. 3A-3B present a flow chart illustrating exemplary process steps that can be used to practice one embodiment of the present invention.
Figure 3B:
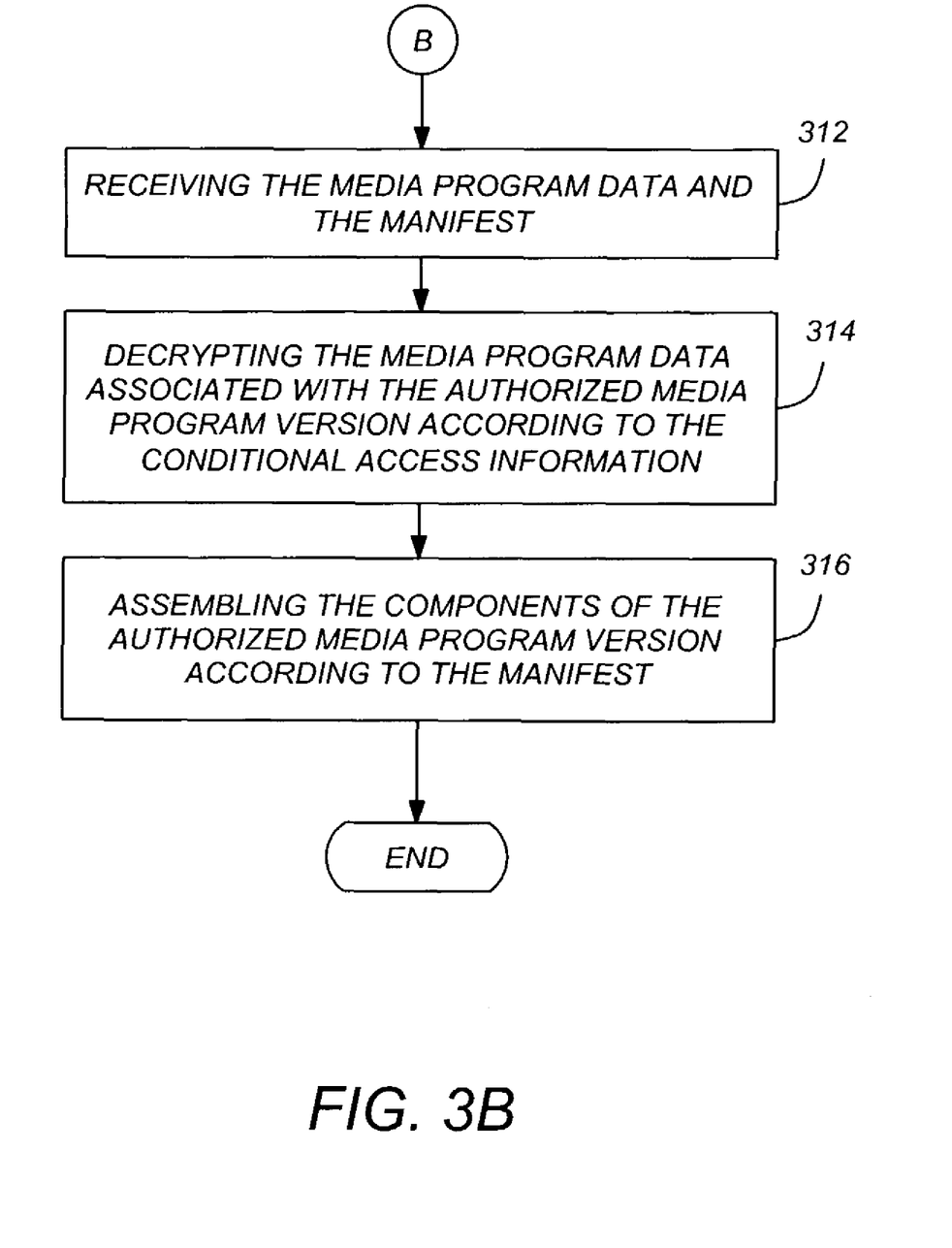

FIGS. 3A-3B present a flow chart illustrating exemplary process steps that can be used to practice one embodiment of the present invention.

Figure 4:
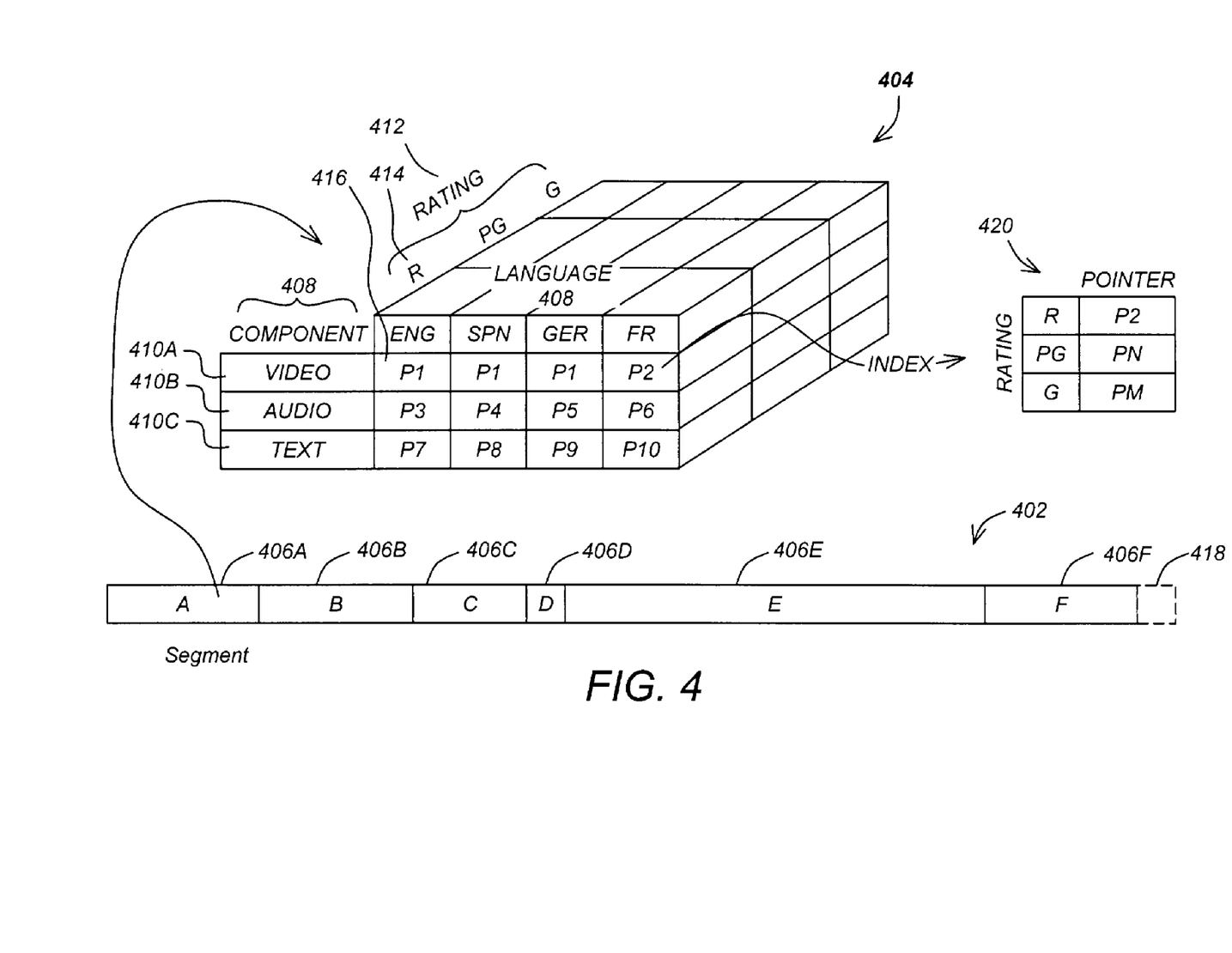
FIG. 4 is a diagram illustrating the structure of the media program data, and the authoring process of partitioning the media program data into components, attributes, and attribute values.

FIG. 4 is a diagram illustrating the structure of the media program data, and the authoring process of partitioning the media program data into components, attributes, and attribute values.

Referring to both FIGS. 3A-3B and FIG. 4, media program data 402, which collectively describes different versions of the media program, is segmented into a plurality of media segments 406A-406F (hereinafter alternatively collectively referred to as media segment(s) 406). This is shown in block 302.

The media program data 402 can be segmented according to the perceived suitability of each segment for separate consideration, and by logical points that correspond to particular video, audio, or text content.

For example, referring to FIG. 4, the media program data 402 has been segmented into segments 406A-406F. Segment 406D example, may be a scene of the film having content which would, by its nature, the appropriate for differing demographic groups (e.g. adult language, violent content, nudity). Similarly, segment 406F may be the finale of the film, with different endings suitable for different demographic groups. Auxiliary segment 418 can include advertising, trailers, or any other material which might be of value if augmented to be media program data 402. If desired, each segment 406 can be tagged for reference in the mapping described below.

In the foregoing example, the segments 406 are defined in terms of scenes, or time slices determined by splice points in time. However, the media program data 402 can be segmented into segments according to other parameters as well. For example, it may be useful to define segments of the media program 402 according to data processing requirements. This would allow high resolution and low-resolution versions of the media program to be defined, a capability of interest for exhibitors without high resolution equipment.

As shown in the mapping 404 illustrated in FIG. 4, each media segment 406 includes at least one component 408, such as video component 410A, audio component 410B, and text component 410C. In addition to those illustrated above, other components 406 may be included. Each component 408 is associated with one or more attributes such as a rating attribute 412 or a language attribute 408. Each attribute 408, 412 includes one or more attribute value(s). For example, rating attribute 412 includes a "R" rating attribute 414. Similarly, language attribute 408 includes attribute values "ENG" for English-language versions of the media program 402, "SPN" for Spanish language versions of the media program 402, "GER" for German language versions of the media program 402, and "FR" for French language versions of the media program 402. Each combination of rating attribute 412 value and language attribute 408 value can be associated an entry which provides a link to the media program data for that particular segment, component, and attribute values. In the illustrated embodiment, the mapping 404 entries include a pointer (P1, P2, ..., PN) such as pointer 416. The pointer 416 provides an indication as to where the associated media program data can be retrieved, so that it may be compiled into the exhibited media program.

Returning to FIG. 3A, block 304 illustrates generating the mapping 404 of each attribute value 414 with a pointer 416 to the component 408 of the segment 406 of the media program data 402 having the attribute 412, 418 associated with the attribute value 414. For example, the mapping 404 shown in FIG. 4 maps attribute value 414 to pointer P1, which indicates where media program data having the attributes (a video component 410A for segment 406A, with a rating attribute 412 of "R", and a language attribute 408 of "English") can be obtained.

The mapping 404 maybe implemented in many ways. The embodiment illustrated in FIG. 4, the mapping 404 is shown as a single multidimensional matrix for each segment 406. However, different embodiment of the mapping 404 can also be used. For example, the mapping 404 may comprise a database, expressed as a plurality of matrices 420 that can be indexed, joined or otherwise combined and/or processed using relational database techniques. All that is required is that for each segment 406, a particular combination of component 408 and attributes 412, 408, a mapping 404 is made to a entry having a pointer for other directive to the associated media program data can be found.

Next, a manifest is generated from the mapping 404, as shown in block 306.

Figure 5A:
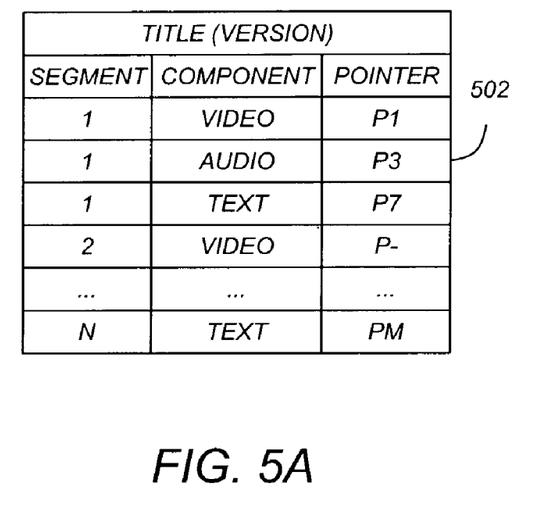
FIG. 5A is a diagram showing an illustrative embodiment of the manifest.

FIG. 5A is a diagram showing an illustrative embodiment of the manifest 502. In this embodiment, the manifest 502 includes the title, a listing of each segment 406, and each component 408 associated with each segment 406. Each component 408 is associated with a pointer. In the illustrated embodiment, the video component of segment 1 406A is associated with pointer P1. This information indicates that for this particular version (title) of the media program, the data obtainable at the location described by pointer P1 is to be used for the video component 410A of the media program. The audio component 410B is obtained at a location described by pointer P3, and he text component 410C is obtained at location described by pointer P7. Using this manifest 502, all of the components 408 for all of the segments 406 of the represented version of the media program can be assembled by the display entity 108.

Returning to FIG. 3A, block 308 describes the generation of conditional access information at least in part from the data describing the media program version authorized for exhibition at the displaying entity 108. Next, the media program data 402, the manifest 502, and the conditional access information is transmitted to the display entity 108. This conditional access data can be incorporated in the manifest 502, sent with the media program data 402 to the displaying entity, or transmitted as a separate file.

Figure 5B:
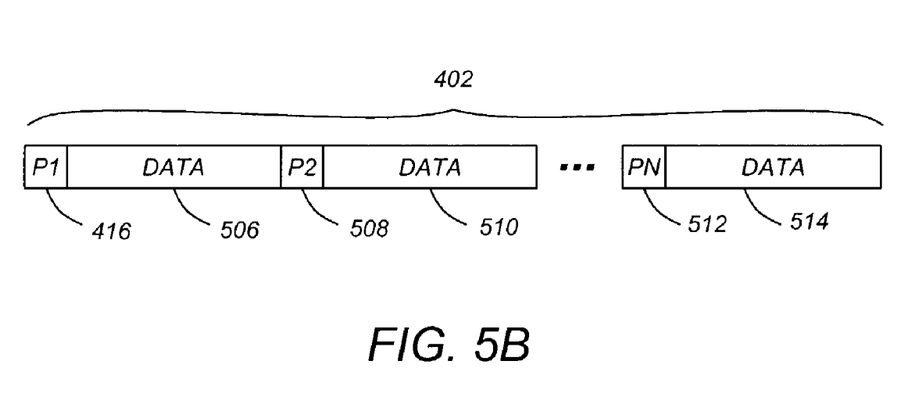
FIG. 5B is a diagram showing an exemplary embodiment of the media program data as it is sent to the display entity.

FIG. 5B is a diagram showing an exemplary embodiment of the media program data 402 as it is sent to the display entity 108. In this embodiment, each pointer 416, 508, and 512, precedes a block of media program data for a particular component 408 of a segment 406 that has the desired attribute for the version of the media program. For example, continuing with the example described above, data 506 includes media program data describing the English language, "R" rated version of the video component 410A of segment 406A, while data 510 includes media program data describing the French language, "R" rated version of the video component 410A of segment 406A.

Turning to FIG. 3B, the media program data 402 in the manifest 502 is received by the display entity 108, as shown in block 312. In block 314, the media program data 402 associated with the media program version that has been authorized is decrypted. This is accomplished by using the conditional access information described above.

Finally, in block 316, the components 408 of the authorized media program version are assembled. This is accomplished by use of the manifest 502. In the example shown in FIG. 5A, the manifest 502 directs the display entity 108 to use the data associated with pointer P1 for the video component 410A, the data associated with pointer P3 for the audio component 410B, and the data associated with pointer P7 40 text component 410G Hence, the display entity 108 will exhibit the data associated with pointers P1, P3, and P7 for segment 1 406A of the media program. Since, however the media program data 402 includes all of the data required to assemble any of the versions of the media program, the display entity may reconstruct a different version of the media program, simply by following the information provided in the manifest 502.

With proper authorization, a display entity 108 can thus schedule the exhibition of different versions of the same movie. This can be accomplished for example via a user interface implemented on a computer.

The media program data for a two can be broadcast in a single file or in multiple files. Further, as described above conditional access information required to decrypt an exhibit each particular version of the same title can be transmitted with the file or in a separate file. Without the version manifest and the proper authorization, a display entity 108 cannot display any versions of the media program. This precludes the deliberate or unintentional selection and display of an unauthorized version. The display entity 108 cannot alter the manifest 502. However, a user-friendly interface is provided to allow an authorized display entity 108 to select from a plurality of authorized versions of the media program.

If desired, advertising content, trailers, and miscellaneous data can be transmitted with the media program data 504, or can be assigned individual manifests to allow selection of appropriate data to correspond to attributes of the primary content.

CONCLUSION

This concludes the description of the preferred embodiments of the present invention, which provides a method to package and display movies and other forms of data with appropriate Motion Picture Association of America (MPAA) rating and other attributes depending on the demographic composition of end users. The demographic profile can be determined by factors such as the geographic location, age, and/or viewing habits of the end user.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of providing media programs to a theater for eventual display, comprising the steps of:
   segmenting media program data collectively describing different versions of the media program into a plurality of media segments wherein each media segment includes at least one component associated with one or more attributes, each having one or more attribute values;
   generating a mapping of each attribute value with a pointer to the component of the segment of the media program having the attribute associated with the attribute value;
   generating conditional access information at least in part from the data describing the authorized media program version;
   generating a manifest, the manifest incorporating the conditional access information and inalterable by the theater from the mapping and from data describing an authorized media program version authorized for display at the theater; and
   transmitting the media program data and the manifest to the theater.

2. The method of claim 1, further comprising the steps of:
   receiving the media program data and the manifest; and
   assembling the components of the authorized media program version according to the manifest.

3. The method of claim 1, further comprising the steps of:
   decrypting the media program data associated with the authorized media program version according to the conditional access information.

4. The method claim 1, wherein the media program data is segmented, by time.

5. The method of claim 1, wherein the media program data is segmented by scene.

6. The method of claim 1, wherein the media program data is segmented into segments by tagging the segments.

7. The method claim 1, wherein the at least one component is selected from the group comprising;
   video;
   audio; and
   text.

8. The method of claim 1, wherein the mapping comprises a database.

9. The method of claim 1, wherein the mapping comprises a matrix.

10. The method of claim 1, wherein the authorized media program version is assembled from data describing authorized components of the segments of the media program.

11. The method of claim 1, further comprising the step of augmenting the media program with an auxiliary media segment.

12. The method of claim 1, wherein the auxiliary media segment is selected from the group comprising:
    a trailer; and
    an advertisement.

13. An apparatus for providing media programs to a theater for eventual display, comprising
    means for segmenting media program data collectively describing different versions of the media program into a plurality of media segments wherein each media segment is includes at least one component associated with one or more attributes, each having one or more attribute values;
    means for generating a mapping of each attribute value with a pointer to the component of the segment of the media program having the attribute associated with the attribute value;
    means for generating conditional access information at least in part from the data describing the authorized media program version;
    means for generating a manifest incorporating the conditional access information and inalterable by the theater from the mapping and from data describing an authorized media program version authorized for display at the theater; and
    means for transmitting the media program data and the manifest to the theater.

14. The apparatus of claim 13, wherein the means for segmenting media program data into a plurality of media segments, for generating a mapping of each attribute value with a pointer to the component of the segment of the media program data having the attribute associated with the attribute value, and for generating a manifest from the mapping and from data describing an authorized media program version authorized for display at the theater comprises one or more data processors.

15. The apparatus of claim 14, wherein the means for transmitting the media program data and the manifest to the theater comprises a ground station, and a satellite in communication with the ground station.

16. The apparatus of claim 13, further comprising:
    means for receiving the media program data and the manifest; and
    means for assembling the components of the authorized media program version according to the manifest.

17. The apparatus of claim 16, wherein:
    the means for receiving the media program data and the manifest comprises a receiver, and the means for assembling the components of the authorized media program version according to the manifest comprises a display entity processor.

18. The apparatus of claim 13, further comprising:
means for decrypting the media program data associated with the authorized media program version according to the conditional access information.

19. The apparatus of claim 13, wherein the media program is segmented by time.

20. The apparatus of claim 13, wherein the media program is segmented by scene.

21. The apparatus of claim 13, wherein the media program is segmented into segments by tagging the segments.

22. The apparatus of claim 13, wherein the at least one component is selected from the group comprising;
video;
audio; and
text.

23. The apparatus of claim 13, wherein, the mapping comprises a database.

24. The apparatus of claim 13, wherein the mapping comprises a matrix.

25. The apparatus of claim 13, wherein the authorized media program version is assembled from data describing authorized components of the segments of the media program.

26. The apparatus of claim 13, further comprising the step of a augmenting the media program with an auxiliary media segment.

27. The apparatus of claim 13, wherein the auxiliary media segment is selected from the group comprising
a trailer; and
an advertisement.

* * * * *